Sept. 14, 1937.   J. A. TENNANT   2,092,819
RELIEF VALVE
Filed April 15, 1935   2 Sheets-Sheet 1

Joseph A. Tennant   INVENTOR.
BY Jesse P. Stone
Lester B. Clark
ATTORNEYS

Patented Sept. 14, 1937

2,092,819

UNITED STATES PATENT OFFICE 2,092,819

RELIEF VALVE

Joseph A. Tennant, Houston, Tex.

Application April 15, 1935, Serial No. 16,429

7 Claims. (Cl. 137—53)

My invention relates to relief valves to be employed in connection with containers or lines in which there is fluid under pressure.

The device relates particularly to safety valves which are intended to open and relieve the pressure in the container when the pressure exceeds a predetermined maximum.

It is an object of the invention to provide a relief valve which is adapted for use with pressure lines in which abnormally high pressures are found.

It is an object of the invention to provide a simple type of relief valve in which the fluid pressure is exerted upon both ends of the valve and to actuate the valve by a preponderance of pressure on one end thereof.

In the usual type of relief valve employed for high pressures it has been found necessary to provide means to hold the valve from movement which will sustain a heavy pressure and will become ineffective to prevent the opening of the valve only under very high pressures. When this is done, however, the structure of the valve and the retaining mechanism must be made particularly strong and substantial in order to sustain the heavy pressures.

I contemplate overcoming this condition by allowing the pressure fluid to be exerted on both ends of the valve, one end being subjected to a greater total pressure than the other. By so doing, a valve retaining means of simple and light construction may be employed.

In the drawings herewith, Fig. 1 is a central longitudinal section through a relief valve employing my invention thereon.

Figure 1:
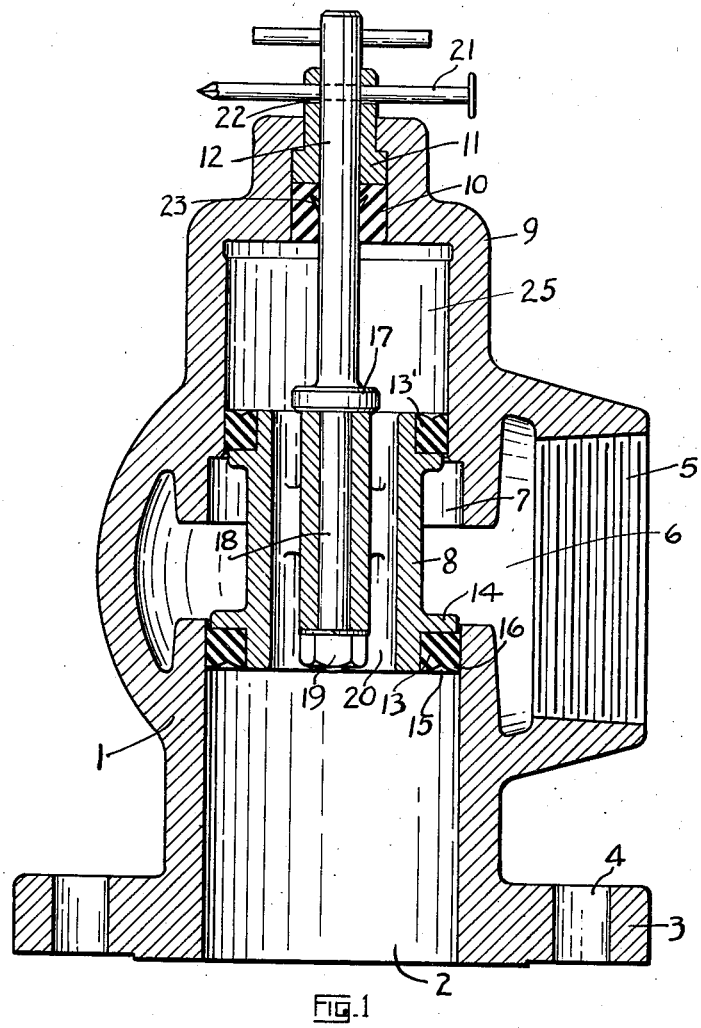
Figure 3:
Fig. 3 is an enlarged detail of the packing mechanism employed around the stem of the valve.
Figure 2:
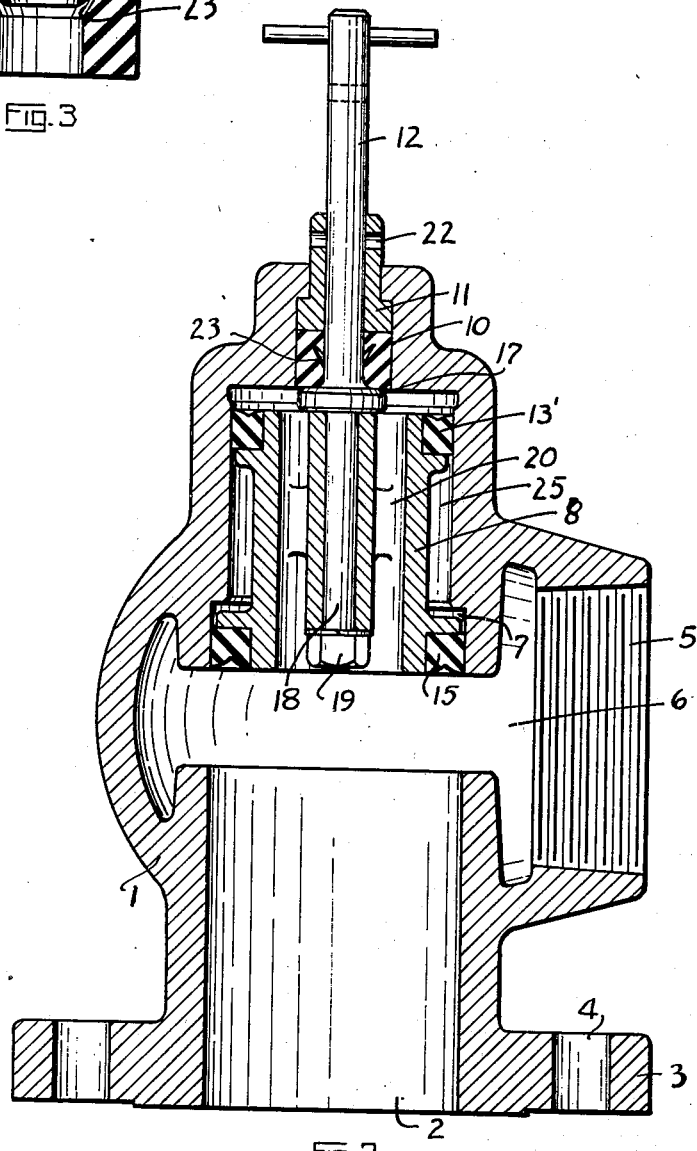
Fig. 2 is a similar view showing the valve in open position.

My device may be attached to any chamber or line in which there is fluid under pressure and where a provision must be made to relieve the pressure at a predetermined maximum value. I have shown a housing 1, which has an inlet chamber 2 leading into the same, and has, at the end which is attached to the pressure container, radial flanges 3 having openings 4 therein through which it may be bolted or otherwise secured to the pressure fluid container.

The housing 1 has a lateral outlet threaded at 5 for attachment to a threaded pipe or other similar fluid conducting member. The outlet 5 leads from an outlet chamber 6 in the adjacent side of the housing.

Between the inlet chamber 2 and the outlet chamber 6 is a valve chamber 7, which is cylindrical in outline to receive a cylindrical piston valve 8. The chamber 7 is reduced slightly in internal diameter at 25 on the end away from the inlet chamber to provide a cylindrical equalizing chamber within which a portion of the valve 8 may fit. This chamber is closed on its outer end by the bonnet 9 of the housing, there being a packing member in said bonnet comprising a compressible packing gasket 10 and a bushing or sleeve 11, said packing member adapted to make a sealing fit around a valve stem 12.

The piston valve 8 has a sealing member on its inner end which comprises a flexible packing ring 13 fitting within a recess in the outer periphery of the piston, bearing at its inner end against a flange 14 on the piston. The packing ring 13 is preferably made of rubber or similar compressible composition having on its end face a V-shaped recess 15 whereby the pressure fluid may engage behind the sealing lip 16 to force the same against the inner wall of the cylindrical chamber 2.

The opposite end of the piston fits within the cylindrical chamber 25 which, as previously noted, is of smaller internal diameter than the chamber 2. The end of the valve piston fitting therein is therefore of smaller area than is the area of the other end of the valve. A seal is made between the piston valve and the cylindrical chamber 25 by means of a packing ring 13' formed in the same manner as is the ring 13 previously described.

The valve stem 12 has an internal flange 17 thereon bearing against the end of the valve. There is an extension on the stem shown at 18, which extends axially of the valve and is threaded on its end to receive the nut 19 by means of which the piston is secured to the stem.

In order to equalize the pressure of the fluid at each end of the valve I provide a fluid-conducting annular channel or bypass 20 longitudinally of the valve around the stem portion 15. This channel allows the pressure fluid to pass freely from the inlet chamber 2 to the equalizing chamber 25. It will be seen, however, that as the area of the inner end of the piston fitting within the chamber 2 is of larger diameter than the end within the equalizing chamber there will always be a predetermined preponderance of pressure on the inner end which tends to open the valve and allow the pressure to escape through the outlet chamber 6.

This preponderance of pressure is normally overcome by a latching means, which includes a shear pin or frangible member 21, which extends through the thimble or bushing 11 in the valve bonnet. This pin is normally made of ordinary steel wire and may be as shown a wire nail extended transversely through the valve stem and through the registering openings 22 in the bushing 11. Thus outward pressure on the piston, tending to open the valve, will be restrained by the transverse pin 21, but when this preponderance reaches a predetermined maximum the pin 21 will shear or break and allow the valve stem to move outwardly.

When the valve is thus relieved and thrown to open position the head 17 upon the valve will engage against the inner end of the ring 10. This ring being of compressible material such as rubber will act as a shock absorber, taking up the shock of the opening of the valve as the head of the valve stem engages therewith, thus preventing a heavy contact of the end of the valve with the inner wall of the chamber. It will be noted that there is an annular recess 23 on the inner wall of the rubber ring 10. This not only allows the accumulation of pressure fluid therein to prevent leakage but also assists the shock-absorbing qualities of the ring in an obvious manner.

My invention is of simple and cheap construction and still enables my device to be used under high pressures. Instead of having to provide an excessively heavy frangible device to release the valve when the predetermined maximum is reached I am enabled to use light and inexpensive equipment which is accurate in its operation and will still operate under the desired pressures.

What is claimed is:

1. A relief valve adapted for connection to a high pressure conduit, said valve comprising a housing, an inlet chamber and an outlet chamber therein, a piston normally separating said chambers, a sealing means on said piston to seal the inlet chamber, an equalizing chamber of a diameter less than said inlet chamber, said piston extending into said equalizing chamber a passage through the piston to equalize the pressure in the inlet and equalizing chambers, sealing means on the piston in the equalizing chamber, a stem on said piston, and means on the housing and stem formed to shear when the pressure differential on said piston in said inlet chamber exceeds a predetermined value.

2. A relief valve adapted for connection to a high pressure conduit, said valve comprising a housing, an inlet chamber, and an outlet chamber therein, a piston normally separating said chambers, a sealing means on said piston to seal the inlet chamber, an equalizing chamber of a diameter less than said inlet chamber, said piston extending into said equalizing chamber a fluid connection between said inlet chamber and said equalizing chamber, a stem on said piston, frangible means normally anchoring said stem to said housing, said frangible means being rendered ineffective to anchor said piston by a predetermined fluid pressure in said inlet passage.

3. A high pressure relief valve including a housing having therein a cylindrical inlet chamber, an outlet chamber and an equalizing chamber aligned with said inlet chamber but of smaller diameter than said inlet chamber, a cylindrical valve member extending into said equalizing chamber, a sealing member on said valve member in each of said inlet chamber and said equalizing chamber, a fluid connection between said inlet and equalizing chambers, and means restraining the movement of said valve member from closed position between said inlet and outlet chambers but adapted to be rendered ineffective to thereafter affect said valve when acted upon by a predetermined pressure in said inlet chamber.

4. A high pressure relief valve including a housing having therein a cylindrical inlet chamber, an outlet chamber and an equalizing chamber aligned with said inlet chamber but of smaller diameter than said inlet chamber, a cylindrical valve member extending into said equalizing chamber, a sealing member on said valve member in each of said inlet chamber and said equalizing chamber, a fluid connection between said inlet and equalizing chambers, and means restraining the movement of said valve member from closed position between said inlet and outlet chambers with a predetermined force, comprising a stem on said valve member slidable in said housing, a bushing about said stem in said housing and a transverse shear pin in said bushing and stem.

5. A housing having an inlet chamber, an outlet chamber extending at right angles to said inlet chamber, and an equalizing chamber aligned with said inlet chamber but of smaller diameter than said inlet chamber, a piston valve having slidable sealing engagement with said inlet and equalizing chambers, a fluid passage longitudinally of said valve connecting said inlet and equalizing chambers, a stem on said valve projecting from said housing, and means associated with said housing and stem to normally prevent longitudinal movement of said valve, said means being rendered ineffective to further affect said valve by a predetermined pressure of fluid in said inlet chamber.

6. A housing having an inlet chamber, an outlet chamber extending at an angle to said inlet chamber, and an equalizing chamber aligned with said inlet chamber but of smaller diameter than said inlet chamber, a piston valve having slidable sealing engagement with said inlet and equalizing chambers, a fluid passage longitudinally of said valve connecting said inlet and equalizing chambers, a stem on said valve projecting from said housing, a bushing in said housing about said stem, a sealing ring in said equalizing chamber about said stem, frangible means to normally restrain the movement of said stem in said bushing with a predetermined force and an abutment on said valve stem positioned to engage said sealing ring when said restraining means is rendered ineffective.

7. A housing having an inlet chamber, an outlet chamber extending at an angle to said inlet chamber, and an equalizing chamber aligned with said inlet chamber but of smaller diameter than said inlet chamber, a piston valve having slidable sealing engagement with said inlet and equalizing chambers, fluid passages longitudinally of said valve connecting said inlet and equalizing chambers, a stem on said valve projecting from said housing, and means associated with said housing and stem to normally prevent longitudinal movement of said valve, said means being rendered permanently ineffective by a predetermined pressure of fluid in said inlet chamber, combined shock absorbing and sealing means in said equalizing chamber about said stem, and an abutment on said stem adapted to engage therewith.

JOSEPH A. TENNANT.